United States Patent
Matsumoto et al.

(10) Patent No.: US 6,897,614 B2
(45) Date of Patent: May 24, 2005

(54) LIGHT EMITTING CIRCUIT AND LIGHTING DEVICE

(75) Inventors: Masatomo Matsumoto, Wako (JP); Masaru Ishizaki, Wako (JP); Isamu Yoshioka, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/363,582

(22) PCT Filed: Nov. 28, 2002

(86) PCT No.: PCT/JP02/12433

§ 371 (c)(1),
(2), (4) Date: Mar. 5, 2003

(65) Prior Publication Data

US 2003/0179583 A1 Sep. 25, 2003

(30) Foreign Application Priority Data

Feb. 20, 2002 (JP) ........................................ 2002-043535

(51) Int. Cl.[7] .................................................. B60Q 7/00
(52) U.S. Cl. ........................ 315/84; 340/468; 340/472; 362/498; 362/543; 362/545
(58) Field of Search .................... 315/77, 84; 340/425.5, 340/468, 469, 472; 307/9.1, 10.1, 10.8; 362/494, 498, 543, 545, 800

(56) References Cited

U.S. PATENT DOCUMENTS

| | | | | |
|---|---|---|---|---|
| 5,803,579 A | * | 9/1998 | Turnbull et al. | 362/516 |
| 6,084,519 A | * | 7/2000 | Coulling et al. | 340/602 |
| 6,561,685 B2 | * | 5/2003 | Weber et al. | 362/494 |
| 6,700,502 B1 | * | 3/2004 | Pederson | 340/815.45 |
| 2001/0046136 A1 | | 11/2001 | Weber et al. | |

FOREIGN PATENT DOCUMENTS

| | | |
|---|---|---|
| JP | 63-80236 | 5/1998 |
| JP | 2000-25519 | 1/2000 |

* cited by examiner

Primary Examiner—Haissa Philogene
(74) Attorney, Agent, or Firm—Merchant & Gould P.C.

(57) ABSTRACT

A light emitting circuit includes: a first circuit H1 in which is provided a main light source 5, 6; and a second circuit H2 connected in parallel with the first circuit H1 and in which is provided an auxiliary light source 1, 2 and 3; wherein a drain (D) and a source (S) of an field effect transistor 4 are connected in the second circuit H2, and a gate (G) of the field effect transistor 4 is connected to the first circuit H1.

15 Claims, 4 Drawing Sheets

LIGHT EMITTING CIRCUIT AND LIGHTING DEVICE

FIELD OF THE INVENTION

The present invention relates to a light emitting circuit and a lighting device for a vehicle, which are particularly used for a side turn light provided at an outer mirror of a vehicle.

BACKGROUND ART

As a high mounted stop lamp, etc. provided at the rear of the vehicle, an LED or the like has been utilized because it requires less electric power consumption and emits light at high luminance. As shown in FIG. 6, this high mounted stop lamp comprises a circuit formed by a plurality of parallel connected LED groups L1~L6, each including the same number of LEDs (four in FIG. 6) connected in series. With this arrangement, even if one LED (any one of LEDs D1~D24) malfunctions, the rest of the LED groups L1~L6 satisfies the demand luminous energy regulated by law.

There is a lighting device with a circuit arrangement similar to this high mounted stop lamp, wherein a main light source that emits light with greater luminous energy in order to satisfy the regulation by law and an auxiliary light source that is used for accessories to dress up the vehicular design are connected in parallel.

This kind of lighting device has been adapted to side turn lights for indicating a change of the direction of the vehicle.

Generally, the side turn lights are provided at side surfaces of the vehicle, and in this instance, the lighting device having the aforementioned circuit arrangement is not required. However, in recent years, the side turn lights have been provided at the outer mirrors instead of being provided at both side surfaces of the vehicle body for the purpose of dressing up the vehicle, and therefore the lighting device has been applied for outer mirrors. In other words, in order to be visible from the sides and the rear of the vehicle, the main light source emitting a sufficient luminous energy that satisfies the regulation is arranged at both edges of the outer mirrors, remotely from and outside of the vehicle compartment, and the auxiliary light source for accessories is arranged at a front of each outer mirror in a position parallel to the main light source.

According to the arrangement of the circuit where the main light source and the auxiliary light source are merely connected in parallel, even if one of the light sources malfunctions, the emission of light is continued by the other light source. Therefore, it is difficult for the driver to recognize the malfunction of the side turn light. Especially, a problem arises when the main light source is run down, because the auxiliary light source continuously emits light with the luminous energy unsatisfying the regulation and the driver may misunderstand that the side turn lights function normally.

The technological problem to be solved by the present invention should be focused in this point, and the object of the invention is to provide a light emitting circuit and a lighting device for a vehicle, which are particularly used for a side turn light provided at an outer mirror of the vehicle, and which stops the emission of light of the auxiliary light source when the main light source is run down so that the run down of the main light source is reliably informed to the driver.

SUMMARY OF THE INVENTION

In order to achieve the above objective, a light emitting circuit according to the invention comprises: a first circuit in which is provided a main light source; and a second circuit connected in parallel with the first circuit and in which is provided an auxiliary light source; wherein a drain and a source of an field effect transistor are connected in the second circuit, and a gate of the field effect transistor is connected to the first circuit.

According to this light emitting circuit, both the main light source and the auxiliary light source emit light in the normal state, however, since one end of the first circuit is connected to the gate of the field effect transistor, the gate voltage becomes zero when the main light source is run down. Therefore, an electric current between the source and the drain of the field effect transistor is shut down so that an electric current does not flow into the second circuit, and the auxiliary light source stops the emission of light. As a result, all the light sources stop the emission of light (lights out state). This makes the driver reliably recognize the run down of the main light source. If the auxiliary light source is run down, the main light source continuously emits light.

Also, in order to achieve the above objective, a lighting device for a vehicle, which is provided in an outer mirror of a vehicle, comprises: a main light source arranged at a side of the outer mirror; an auxiliary light source arranged at a front of the outer mirror; and a light emitting circuit having a first circuit in which is provided the main light source, and a second circuit connected in parallel with the first circuit and in which is provided the auxiliary light source, wherein a drain and a source of an field effect transistor are connected in the second circuit, and a gate of the field effect transistor is connected to the first circuit.

According to this lighting device for a vehicle, at the side of the outer mirror is arranged the main light source emitting a sufficient luminous energy that satisfies the regulation by law, and the auxiliary light source for accessories is arranged at the front of the outer mirror. In this lighting device, the first circuit where the main light source is provided is connected to the gate of the field effect transistor, and if the main light source is run down, the gate voltage becomes zero, so that an electric current between the source and the drain of the field effect transistor is shut down and the auxiliary light source provided in the second circuit stops the emission of light. On the contrary, if the auxiliary light source is run down, the main light source continuously emits light. With this construction, if the main light source is run down, both of the main light source and the auxiliary light source provided at the outer mirror stop the emission of light. This can make the driver immediately recognize the run down of the main light source to perform a suitable maintenance.

Further, a light emitting circuit according to the present invention comprises: a first circuit in which is provided a main light source; and a second circuit connected in parallel with the first circuit and in which is provided an auxiliary light source; wherein an emitter and a collector of a bipolar transistor are connected in the second circuit, and a base of the bipolar transistor is connected to the first circuit.

According to this light emitting circuit, like the aforementioned light emitting circuit, both the main light source and the auxiliary light source emit light in the normal state, however, since the first circuit is connected to the base of the bipolar transistor, the base voltage becomes zero when the main light source is run down. Therefore, an electric current between the emitter and the collector of the bipolar transistor is shut down so that an electric current does not flow into the second circuit, and the auxiliary light source stops the emission of light. As a result, all the light sources stop the emission of light (lights out state). This makes the driver reliably recognize the run down of the main light source. If the auxiliary light source is run down, the main light source continuously emits light.

Further, a lighting device for a vehicle according to the present invention, which is provided in an outer mirror of a vehicle comprises: a main light source arranged at a side of the outer mirror; an auxiliary light source arranged at a front of the outer mirror; and a light emitting circuit having a first circuit in which is provided the main light source, and a second circuit connected in parallel with the first circuit and in which is provided the auxiliary light source, wherein an emitter and a collector of a bipolar transistor are connected in the second circuit, and a base of the bipolar transistor is connected to the first circuit.

According to this lighting device for a vehicle, at the side of the outer mirror is arranged the main light source emitting a sufficient luminous energy that satisfies the regulation by law, and the auxiliary light source for accessories is arranged at the front of the outer mirror. In this lighting device, the first circuit where the main light source is provided is connected to the base of the bipolar transistor, and if the main light source is run down, the base voltage becomes zero, so that an electric current between the collector and the emitter of the bipolar transistor is shut down and the auxiliary light source provided in the second circuit stops the emission of light. On the contrary, if the auxiliary light source is run down, the main light source continuously emits light. With this construction, if the main light source is run down, both of the main light source and the auxiliary light source provided at the outer mirror stop the emission of light. This can make the driver immediately recognize the run down of the main light source to perform a suitable maintenance.

Furthermore, in the aforementioned light emitting circuit and lighting device for a vehicle, the main light source emits light at a luminance higher than the auxiliary light source.

According to these light emitting circuit and lighting device for a vehicle, the light emitting circuit or the lighting device for a vehicle is formed from the main light source and the auxiliary light source, and the main light source uses a luminous member with higher luminance so that the emission of light only by the main light source satisfies the regulation. Therefore, a cheap luminous member with lower luminance may be used as the auxiliary light source to decrease the production cost. As described above, since a cheap luminous member is used as the auxiliary light source, it is possible to reduce the number of luminous members unless it spoils the design, as well as to decrease the production cost. Meanwhile, if it is not necessary to decrease the production cost, the number of luminous members used for the auxiliary light source can be increased at the same cost so that the luminescence area is increased to improve the design. As the luminous member, an LED is preferable.

Furthermore, in the aforementioned lighting device for a vehicle, the outer mirror is a door mirror.

According to this lighting device for a vehicle, since the lighting device according to the invention is incorporated in a door mirror, the lighting device can be provided at a position higher than the conventional lighting device, leading to improved visibility from others at the time of emission.

BEST MODE FOR CARRYING OUT THE INVENTION

With reference to the drawings when necessary, a preferred embodiment of the present invention will be described.

Figure 1:
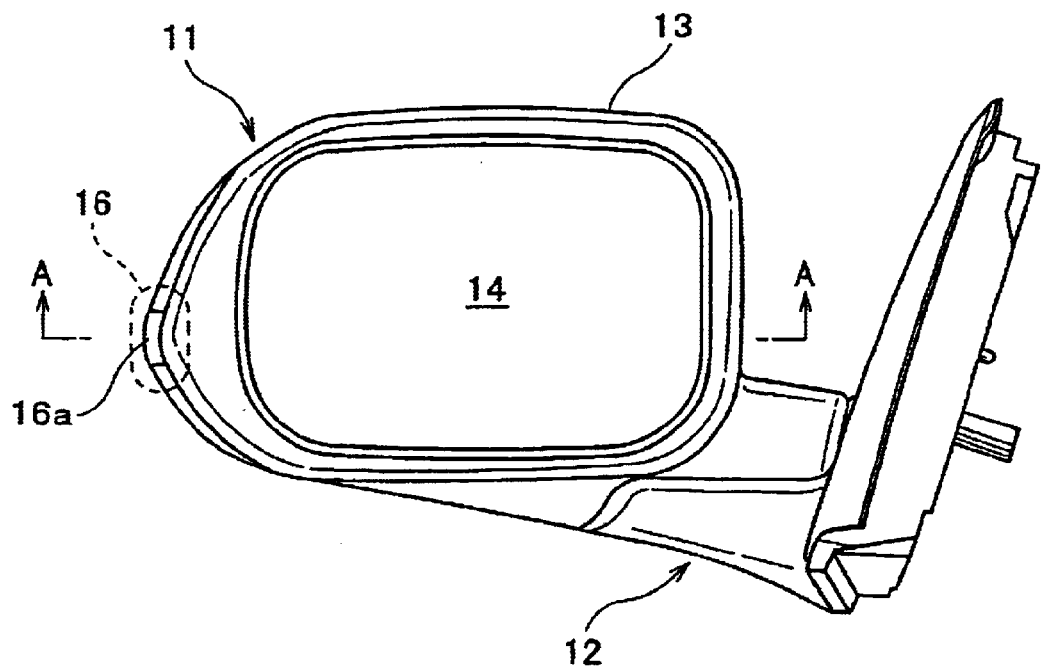
FIG. 1 is a front elevation of a door mirror incorporating a lighting device according to the invention, viewing from the rear of a vehicle body.
Figure 2:
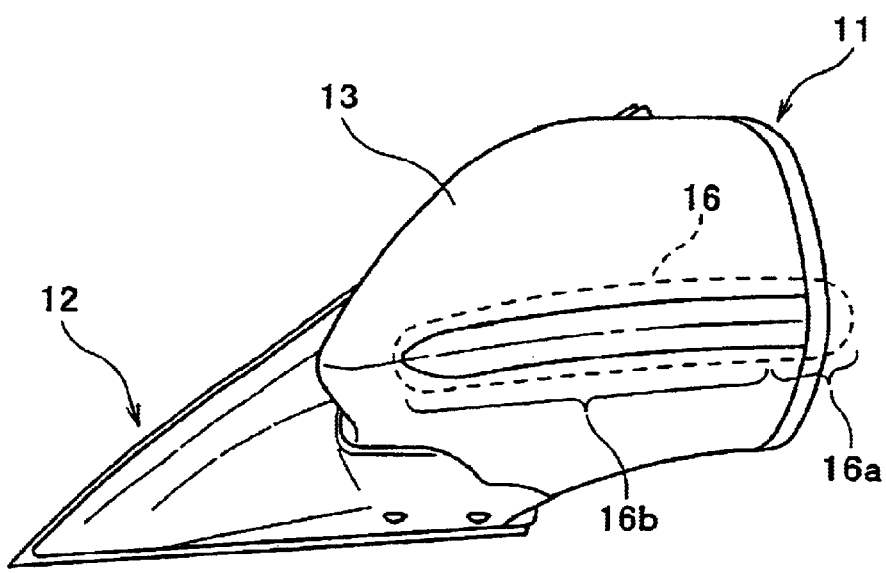
FIG. 2 is a side elevation of the door mirror incorporating the lighting device according to the invention.
Figure 3:
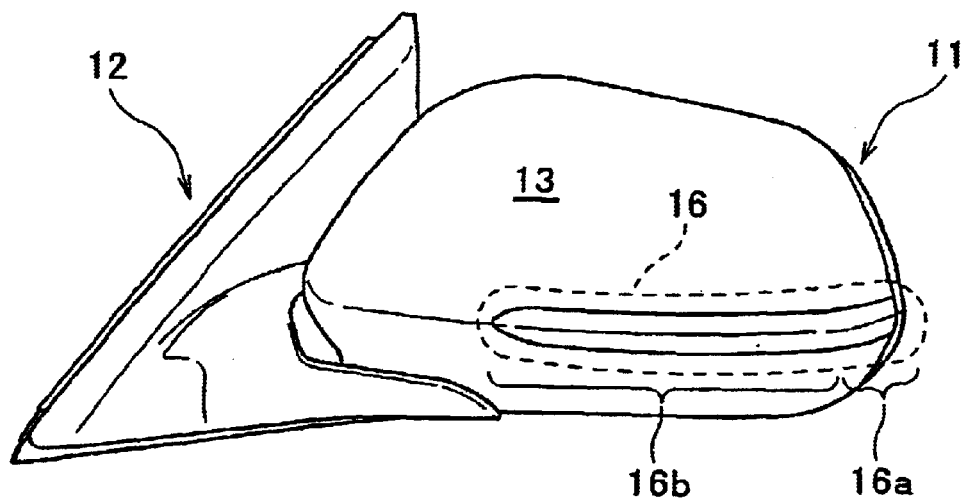
FIG. 3 shows the door mirror incorporating the lighting device according to the invention, viewing diagonally from the front of the vehicle body.
Figure 4:
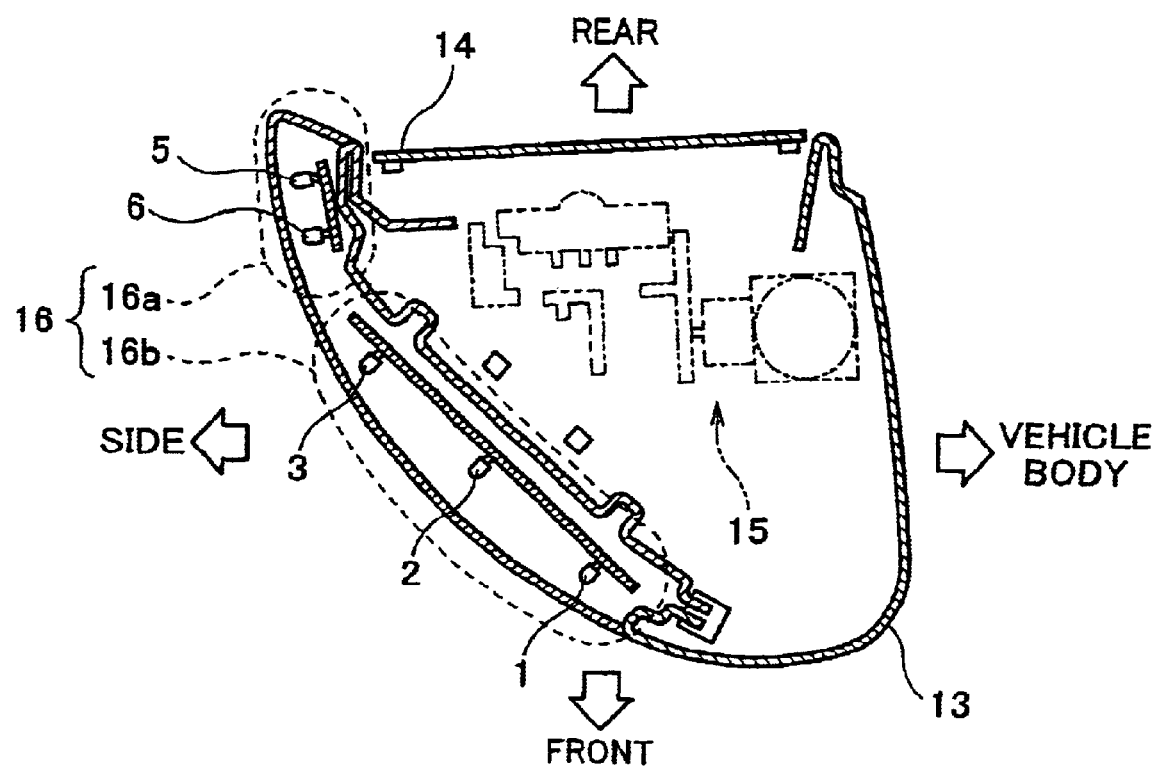
FIG. 4 is a sectional view taken along the line A—A of FIG. 1.
Figure 5:
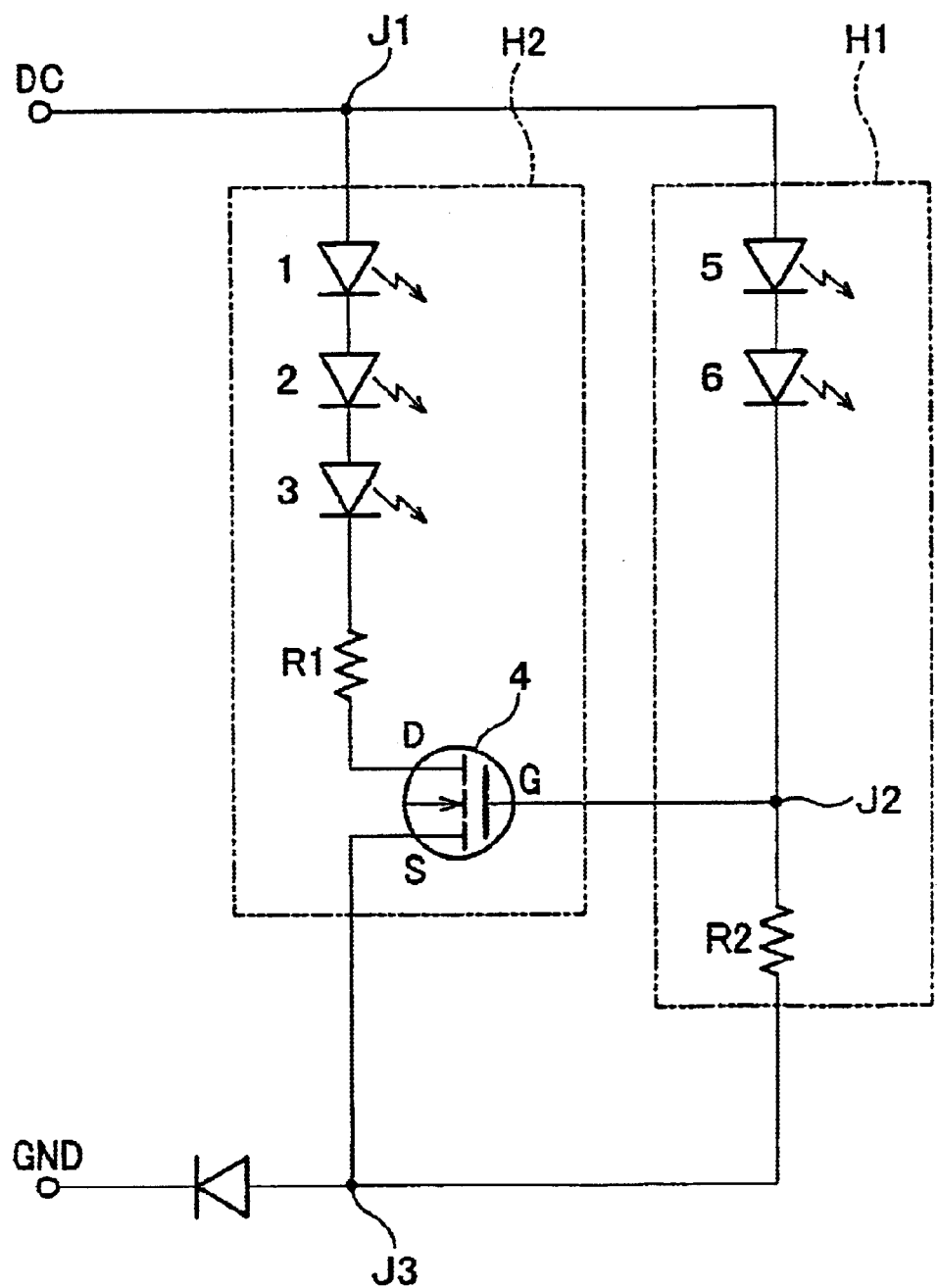
FIG. 5 is a circuit diagram of a light emitting circuit used for the lighting device according to the invention.
Figure 6:
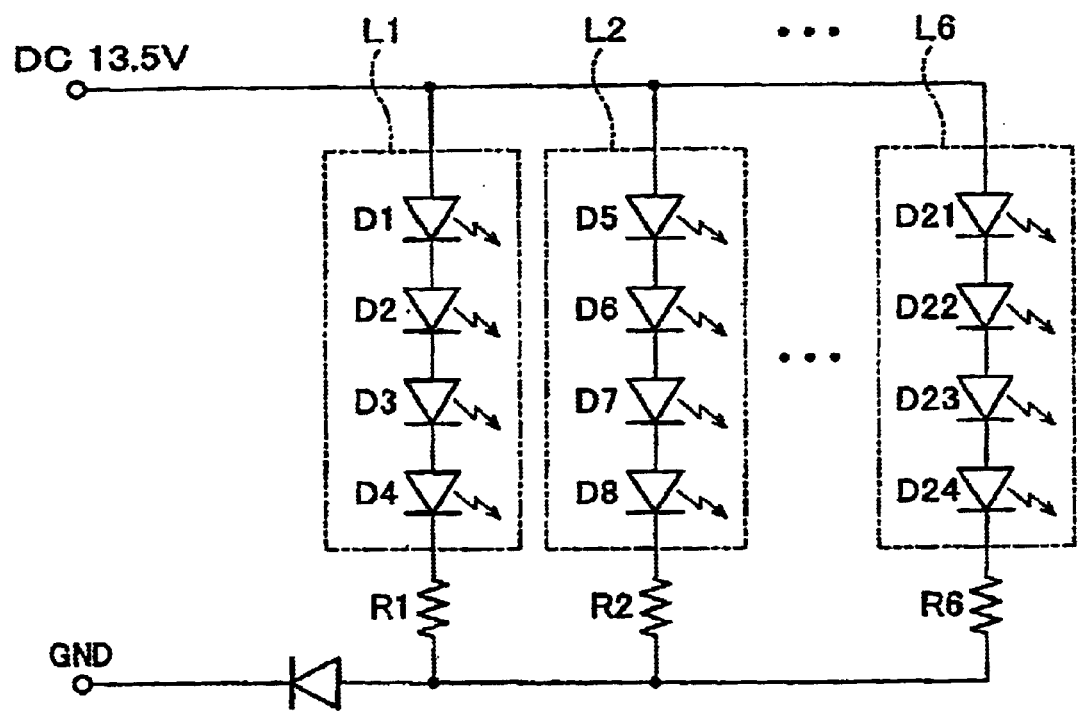
FIG. 6 is a circuit diagram of a high mounted stop lamp.

FIG. 1 is a front elevation of a door mirror incorporating a lighting device according to the invention, viewing from the rear of a vehicle body, FIG. 2 is a side elevation of the door mirror, FIG. 3 shows the door mirror viewing diagonally from the front of the vehicle body, FIG. 4 is a sectional view taken along the line A—A of FIG. 1, and FIG. 5 is a circuit diagram of a light emitting circuit used for the lighting device according to the invention.

A door mirror 11 is used for viewing the rear side, and is mounted near a front end of a door frame of a front door. The door mirror 11 includes a base 12 to be a connecting member to the vehicle body, a housing 13 retained by the base 12 and supporting a mirror 14, and a driving device 15 (FIG. 4) accommodated in a space formed between the mirror 14 and the housing 13 and changing the reflection angle of the mirror 14. The housing 13 has a shape which does not include any projections, and rotates backwards of the vehicle body when a certain force is applied from the front side.

A lighting device 16 according to the invention (hereinafter referred to as a side turn light 16) is provided at the housing 13. The side turn light 16 includes a main light source 16a arranged at an arcuate end part of the housing 13 which remotes from the vehicle compartment, and an auxiliary light source 16b arranged on a surface of the housing 13 and extending from the main light source 16a at a certain length.

Arrangement of the main light source 16a and the auxiliary light source 16b is shown by the sectional view of FIG. 4. As the main light source 16a, high-luminance LEDs 5, 6, which emit light with luminance higher than the auxiliary light source 16b to be described later and to satisfy the regulation by law, are arranged along the surface of the housing 13 at a position visible from the rear and the side of the vehicle and form a first circuit H1 (FIG. 5). As the auxiliary light source 16b, three LEDs 1, 2 and 3 are arranged along the surface of the housing 13, extending from the main light source 16a and towards the front of the vehicle, and form a second circuit H2 (FIG. 5).

The side turn light 16 turns on and off at a predetermined time interval when the vehicle changes the route, so as to inform rear and side vehicles about the change of the route. The luminous energy of the side turn light 16 is determined by law. Since the main light source 16a is arranged at the arcuate end of the housing 13 remotely from the vehicle compartment and is visible from the side and the rear of the vehicle, it substantially functions as the side turn light 16. Therefore, the main light source 16a alone is required to emit light with the luminous energy that satisfies the regulation. On the contrary, since the auxiliary light source 16b is not visible from the rear of the vehicle, as clearly shown by FIG. 1 and the like, and is merely used for an accessory to improve the design of the vehicle, the luminous energy of the auxiliary light source 16b at the time of emission may be smaller than that of the main light source 16a.

Next, with reference to the circuit diagram of FIG. 5, operation of the side turn light 16 according to the invention will be described.

The light emitting circuit shown in FIG. 5 consists of the first circuit H1 and the second circuit H2, which are branched off in parallel at a connecting point J1. The first circuit H1 includes high-luminance LEDs 5, 6, which are connected in series, and the second circuit H2 includes LED 1, LED 2, and LED 3, which are connected in series.

The cathode of the LED 3 in the second circuit H2 is connected to the drain (D) of an enhancement-mode field effect transistor (FET) 4 through a resistance R1, and the source (S) of the FET 4 is connected to a circuit from the first circuit H1 at a connecting point J3. Accordingly, since the LEDs 1, 2 and 3 of the second circuit H2 are connected to the source (S) and the drain (D) of the enhancement-mode FET 4, as long as a certain voltage is applied to the gate (G) of the FET 4 to be described later, the LEDs 1~3 of the second circuit H2 can emit light.

Meanwhile, the cathode of the high-luminance LED 6 in the first circuit H1 is branched off at a connecting point J2, and one end of which is connected to the gate (G) of the FET 4. Therefore, unless the first circuit H1 is run down, a certain voltage is applied to the gate (G) of the FET 4. The other end of the cathode that is branched off at the connecting point J2 is connected to a circuit from the second circuit H2 at the connecting point J3 through a resistance R2.

As high-luminance LEDs 5, 6 used in the first circuit H1, an LED which emits light at higher luminance so as to satisfy the regulation by law may be preferably employed. As LEDs 1, 2 and 3 used in the second circuit H2, since a particular demand such as required for high-luminance LEDs 5, 6 is not necessary, the standard of the LEDs 1, 2 and 3 may be determined in consideration of the production cost and the design of the side turn light 16.

In this light emitting circuit, if the high-luminance LED 5 or/and the high-luminance LED 6, both high-luminance LEDs 5, 6 which are the main light source 16a to, form the first circuit H1, is run down, the voltage applied to the gate (G) of the FET 4 becomes zero. Therefore, an electric current flowing between source (S) and drain (D) of the FET 4 becomes zero, and the auxiliary light source 16b to form the second circuit H2 also stops the emission of light.

On the contrary, even if the LEDs 1, 2 and 3 to form the second circuit H2 are run down, the first circuit H1 is not affected by these LEDs, and the main light source 16a continuously emits light at a sufficient luminance to satisfy the regulation.

As described above, in the side turn light 16 equipped with the light emitting circuit according to the invention, if the main light source 16a that should satisfy the regulation is run down, the auxiliary light source 16b also stops the emission of light and the side turn light wholly stops the emission of light. Therefore, the run down of the main light source 16a is reliably informed to the driver so that the driver immediately performs a suitable maintenance.

Although an LED is employed in the preferred embodiment of the invention, it is possible to employ a bipolar transistor such that the emitter and the collector of the bipolar transistor are connected in the second circuit H2 and the base of the bipolar transistor is connected to the first circuit H1.

Also, in the preferred embodiment of the invention, two LEDs are employed as high-luminance LEDs 5, 6, and three LEDs are employed as LEDs 1, 2 and 3. However, of course, the number of LEDs is not limited to this specific embodiment.

Further, in the preferred embodiment of the invention, the light emitting circuit according to the invention is shown as an example applied to the door mirror 11 (see FIG. 1, etc.). However, the light emitting circuit may be applied to a fender mirror.

INDUSTRIAL APPLICABILITY

By the reasons to be described below, a light emitting circuit and a lighting device for a vehicle according to the invention is preferable for use in a side turn light provided at an outer mirror of a vehicle.

(1) In the light emitting circuit according to the invention, since one end of the first circuit in which is provided a main light source is connected to the gate of an enhancement-mode FET (or the base of a bipolar transistor) and the second circuit in which is provided an auxiliary light source is connected to the source or the drain of this enhancement-mode FET (or the emitter or the collector of the bipolar transistor), if the main light source is run down, a voltage applied to the gate (or the base) becomes zero and the auxiliary light source stops the emission of light. This makes the driver reliably recognize the run down of the main light source.

(2) The lighting device for a vehicle according to the invention is provided at an outer mirror such as a door mirror and a fender mirror. This lighting device consists of the main light source with a sufficient luminous energy that satisfies the regulation and the auxiliary light source that emit light for accessory purposes, and one end of a first circuit in which is provided the main light source is connected to the gate of an enhancement-mode FET (or the base of a bipolar transistor) and a second circuit in which is provided the auxiliary light source is connected to the source or the drain of this enhancement-mode FET (or the emitter or the collector of the bipolar transistor). In this construction, if the main light source is run down, a voltage applied to the gate (or the base) becomes zero and the auxiliary light source also stops the emission of light. Accordingly, the run down of the main light source is reliably informed to the driver.

(3) In the lighting device for a vehicle and the light emitting circuit according to the invention, the main light source that requires sufficient luminous energy so as to satisfy the regulation by law is formed by a high-luminance member (e.g., LED), and a low-luminance member (e.g., LED) with a luminance lower than the main light source is employed as the auxiliary light source. Therefore, a cheap luminance member with lower luminance may be used for the auxiliary light source, leading to decreased production cost of the whole lighting device and light emitting circuit.

(4) Since the lighting device for a vehicle according to the invention is incorporated in a door mirror, the side turn light can be provided at a position higher than the conventional side turn light, leading to improved visibility from others at the time of emission.

What is claimed is:

1. A light emitting circuit comprising:
    a first circuit in which is provided a main light source; and
    a second circuit connected in parallel with the first circuit and in which is provided an auxiliary light source;
    wherein a drain and a source of an field effect transistor are connected in the second circuit, and a gate of the field effect transistor is connected to the first circuit;

wherein if the main light source runs down such that a voltage at the gate falls below a threshold voltage, current does not flow through the auxiliary light source.

2. A light emitting circuit according to claim 1, wherein said main light source emits light at a luminance higher than said auxiliary light source.

3. A light emitting circuit for a vehicle according to claim 1, wherein if the auxiliary light source runs down, current is not prevented from running through the main light source.

4. A light emitting circuit for a vehicle according to claim 1, wherein if the main light source runs down, the voltage at the gate of the field effect transistor becomes zero.

5. A lighting device for a vehicle, which is provided in an outer mirror of a vehicle, comprising:

a main light source arranged at a side of the outer mirror;

an auxiliary light source arranged at a front of the outer mirror; and a light emitting circuit having a first circuit in which is provided the maim light source, and a second circuit connected in parallel with the first circuit and in which is provided the auxiliary light source, wherein a drain and a source of an field effect transistor are connected in the second circuit, and a gate of the field effect transistor is connected to the first circuit;

wherein if the main light source runs down such that a voltage at the gate falls below a threshold voltage, current does not flow through the auxiliary light source.

6. A lighting device for a vehicle according to claim 5, wherein said main light source emits light at a luminance higher than said auxiliary light source.

7. A lighting device for a vehicle according to claim 5, wherein said outer mirror is a door mirror.

8. A lighting device for a vehicle according to claim 6, wherein said outer mirror is a door mirror.

9. A lighting device for a vehicle, which is provided in an outer mirror of a vehicle, comprising:

a main light source arranged at a side of the outer mirror;

an auxiliary light source arranged at a front of the outer mirror; and a light emitting circuit having a first circuit in which is provided the main light source, and a second circuit connected in parallel with the first circuit and in which is provided the auxiliary light source, wherein an emitter and a collector of a bipolar transistor are connected in the second circuit, and a base of the bipolar transistor is connected to the first circuit;

wherein if the main light source runs down such that a voltage at the base of the bipolar transistor falls below a threshold voltage, current does not flow through the auxiliary light source.

10. A lighting device for a vehicle according to claim 9, wherein said outer mirror is a door mirror.

11. A lighting device for a vehicle according to claim 9, wherein said main light source emits light at a luminance higher than said auxiliary light source.

12. A light emitting circuit comprising:

a first circuit in which is provided a main light source; and a second circuit connected in parallel with the first circuit and in which is provided an auxiliary light source;

wherein an emitter and a collector of a bipolar transistor are connected in the second circuit, and a base of the bipolar transistor is connected to the first circuit;

wherein if the main light source runs down such that a voltage at the base of the bipolar transistor falls below a threshold voltage, current does not flow through the auxiliary light source.

13. A light emitting circuit for a vehicle according to claim 12, wherein if the auxiliary light source runs down, current is not prevented from running through the main light source.

14. A light emitting circuit according to claim 12, wherein said main light source emits light at a luminance higher than said auxiliary light source.

15. A light emitting circuit for a vehicle according to claim 12, wherein if the main light source runs down, the voltage at the base of the bipolar transistor becomes zero.

* * * * *